Dec. 24, 1968   P. BARIGANT   3,417,608
DEVICE FOR DETERMINING THE MODULUS OF
YOUNG OF VISCO-ELASTIC MATERIALS
Filed May 12, 1966   2 Sheets-Sheet 1

Inventor:
Pierre Barigant
By Kenyon, Palmer,
Stewart & Estabrook
Attorneys 3,417,608
DEVICE FOR DETERMINING THE MODULUS OF YOUNG OF VISCO-ELASTIC MATERIALS
Pierre Barigant, Paris, France, assignor to L'Electronique Appliquee, Paris, France
Filed May 12, 1966, Ser. No. 549,666
Claims priority, application France, June 8, 1965, 19,793
3 Claims. (Cl. 73—67.1)

ABSTRACT OF THE DISCLOSURE

An apparatus is disclosed for measuring Young's modulus for visco-elastic materials, which materials have the characteristic that the ratio of the passband of the resonance curve does not exceed ten percent. A test specimen is clamped at a fixed point along its length in a vibrator device which causes flexure of the specimen between a free end thereof and the clamping point. Vibration amplitude and frequency sensors are positioned on either side of the specimen at the clamping point and at a free end of the specimen. The signals from the sensors are used to separately modulate the output of a signal generator having a frequency which is high with respect to the frequency of the vibrator, and the modulated signals are then compared by measuring the ratio of their amplitudes and the relative phase shift of their waveforms to yield results proportional to the modulus and argument of the coefficient of mechanical amplification of the test piece. The actual value of Young's modulus may then be determined from these values and the value of the period of the vibration of the test piece.

---

The present invention concerns improvements in or relating to the determination of the modulus of Young of visco-elastic materials such as plastic materials, for which the ratio of the pass-band of the resonance curve does not substantially exceed ten percent.

An object of the invention is so to improve the arrangements disclosed in the U.S. copending application Ser. No. 358,875 now U.S. Patent 3,319,460 that these improved arrangements further enable the determination of the modulus of Young for visco-elastic materials for which the ratio of the imaginary part to the real part of the modulus is higher than .1. The apparatus of this invention is specially adapted for measuring the modulus of Young of soft visco-elastic materials such as, for instance, rubbers, within a wide range of frequencies.

The value of the modulus of Young of a material is given by the relation:

(i) $$E = E' + j \cdot E'' = \frac{\omega^2 \cdot L^2 \cdot \rho \cdot S}{\beta^4 \cdot I}$$

wherein $j = \sqrt{-1}$, and $\omega$ denotes the pulsation of the drive into vibration of a test-piece of material having a length L, a cross-section S, a density $\rho$ and an inertia coefficient I; and wherein $\beta$ is the complex wave coefficient related to the mechanical amplification coefficient $\alpha/\varphi$ of the driven test-piece. One has:

(ii) $$\beta = \beta_1 - j \cdot \beta_2$$

and (iii) $$\alpha/\varphi = \frac{\cos \beta + ch\beta}{1 + \cos \beta - ch\beta}$$

The mechanical amplification coefficient has the same definition as in the above identified U.S. patent, i.e. the ratio of the oscillation amplitudes at one end and at the middle of a test-piece, said end being free and said middle being a point at which the test-piece is attached to the drive member. As it will be apparent hereinafter, said midpoint attachment may be merely replaced by an attachment of the other end of the test-piece to the driving member.

From the above, it may be considered that the measurement of the mechanical amplification coefficient, both in modulus $\alpha$ and in argument $\varphi$ determines the complex wave number $\beta$ and consequently the value of the concerned modulus of Young.

In the above identified U.S. patent, the measurement of the mechanical coefficient is made by sighting means in two successive steps, the first concerning the vibration of a free end of the test-piece and the other concerning the vibration of the point to which the test-piece was attached to its drive member.

In contradistinction thereto, according to the present invention, means are associated with the test-piece arrangement for automatically and permanently sensing the movements of a free end of the test-piece and of its end or point attached to its drive member, said means generating electrical signals which are applied to a measuring device displaying the values of the modulus and argument of the said mechanical amplification coefficient.

Reference is made to the accompanying drawings, wherein.

Figure 1:
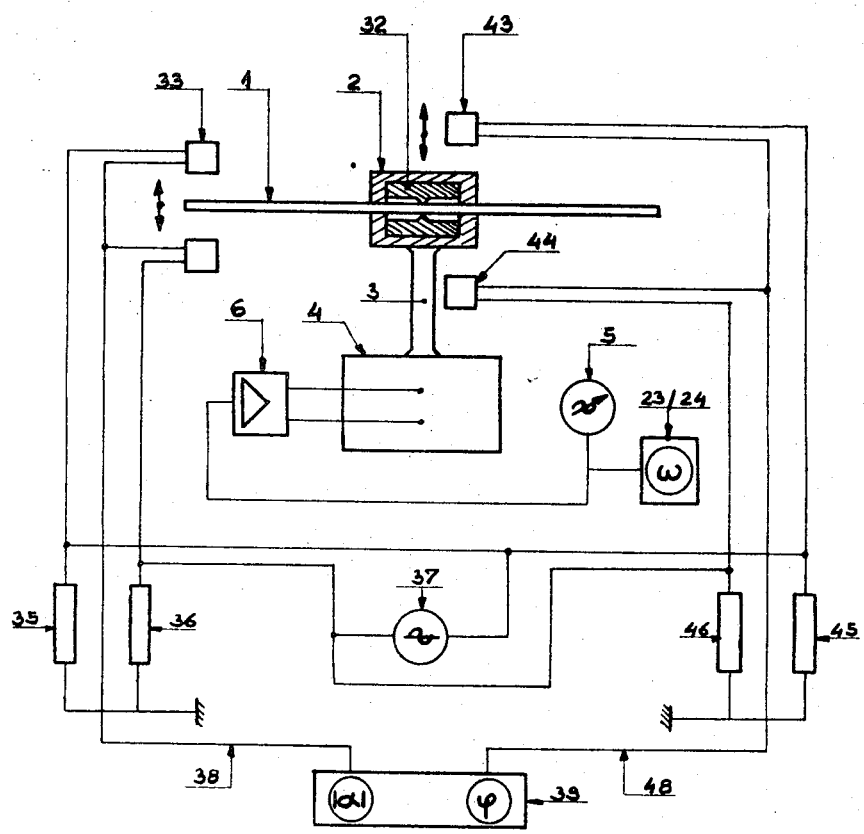
FIG. 1 shows one embodiment of a device according to the present invention.

Referring to FIG. 1, the test-piece 1 is supported by its mid-point in a support 2, that is to say it is substantially supported in a nodal plane of its geometry. In said support 2 the test-piece is pinched by means of hard rubber jaws or the like so that, while being maintained as if it were set in the support, from the point of view of the vibration thereof, it will center itself automatically during the vibration to reach an equilibrium condition of the two parts on either side of the point at which it is pinched by the jaws.

The support 2 is connected by a rod 3 to the moving member of a vibrating tank 4 in accordance with the arrangement described in the above identified U.S. patent, with the provision of a stretcher if necessary. The vibrating tank 4 is driven from an electrical generator 5 through a wide band amplifier 6. Across the output of the generator 5 is connected a periodometer 23, the display scale of which is shown at 24. Such a meter could be connected to the output of the amplifier 6 when required. The reading of meter 23 during a test will indicate the value of $\omega$, to be used in the further computation of the value of the modulus of Young, see relation (i) supra. Instead of measuring the period at the output of the generator or of the amplifier, it may be measured also from a photoelectric pick-up arrangement as explained in U.S. Patent 3,319,460.

In order to simplify the drawing, the thermostatic enclosure, the heating arrangement and the temperature regulator described in said Patent 3,319,460 are not herein reproduced, though they obviously are necessary for accurate measurement.

The generator 5 may be adjusted, for example, to a frequency within a range from 1 to 5,000 cycles per second. The passband of the amplifier 6 should be at least twice the highest frequency of the generator 5.

Near a free end of the test-piece a pair of inductive or capacitive pick-up members 33–34 are positioned to surround the desired part of the test-piece. These are connected in two branches of a Wheatstone bridge, the two other branches of which include compensating impedances 35–36. The bridge is fed from an A.C. generator 37 of higher frequency than the generator 5, and for instance which may reach up to 25,000 cycles per second. In the other diagonal of the bridge, the point of connection of the compensating resistors or impedances may be connected to ground and the other apex to which 33 and 34 are connected, may be connected through lead 38 to an input of a quadripole values measuring device 39 for displaying the measured values of $\alpha$ and $\varphi$.

Similarly, in the immediate vicinity of the support 2 and spaced on opposite sides of this support is arranged a second pair of pick-up members 43–44 of same characteristic of impedance as the pick-up members 33–34. These are connected in two branches of a further Wheatstone bridge comprising the compensating impedances 45–46 and fed with the same high frequency supply as the first. In the other diagonal of said second bridge the apex connecting the compensating impedances is also grounded and the apex connecting the pick-up members is connected by lead 48 to the other input of the device 39.

In rest condition, each bridge is adjusted to equilibrium. Once the generator 5 activates the tank 4 and consequently the support 2 and test-piece 1, the impedances of 33 and 34 in the first bridge, the impedances of 43 and 44 in the second bridge vary in an alternating fashion and in relative opposition in each pair so that each bridge is unbalanced in a continuous fashion. Such variation of unbalance modulates the high frequency voltage applied by generator 37 on the lead 38 and on the lead 48. The depth of each one of such amplitude modulations is proportional to the amplitude of the mechanical vibration of the arrangement at its concerned pick-off location.

The two signals which are thus generated are applied to the inputs of a device for measuring the transmission characteristics of a quadripole. Such a known device measures and displays the attenuation of an electric signal passing through a quadripole from a comparison of the amplitude of said signal to the amplitude of a reference signal; it further measures and displays the relative phase-shift of such an electric signal having passed through a quadripole to a reference signal, and more specifically, it also measures and displays the phaseshift introduced on the attenuated signal with respect to the reference phase of the said reference signal. Consequently, such a device measures the amplitude ratio of two electric signals, consequently the modulus, and the relative phaseshift of two signals, consequently the argument. As introduced in the device of the invention, without any modification or adaptation in itself, such a device will consequently display the value of the modulus of the mechanical amplification coefficient $|\alpha|$ and the argument $\varphi$ of said coefficient which is the purpose of the device.

Figure 2:
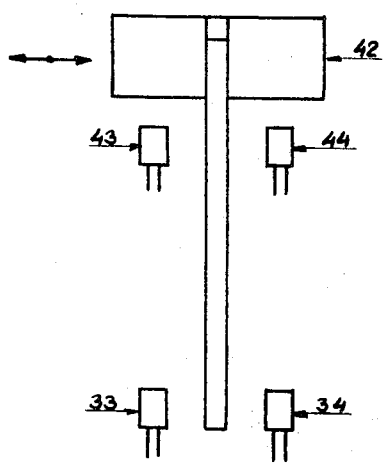
FIG. 2 shows a partial modification of the device of FIG. 1.

In the partial modification shown in FIG. 2, the test-piece 1 is vertical and pinched at its upper end in a support 42 which is laterally vibrated. Such a modification is specially advantageous for soft materials and it does not change anything else in the device according to the present invention.

Figure 3:
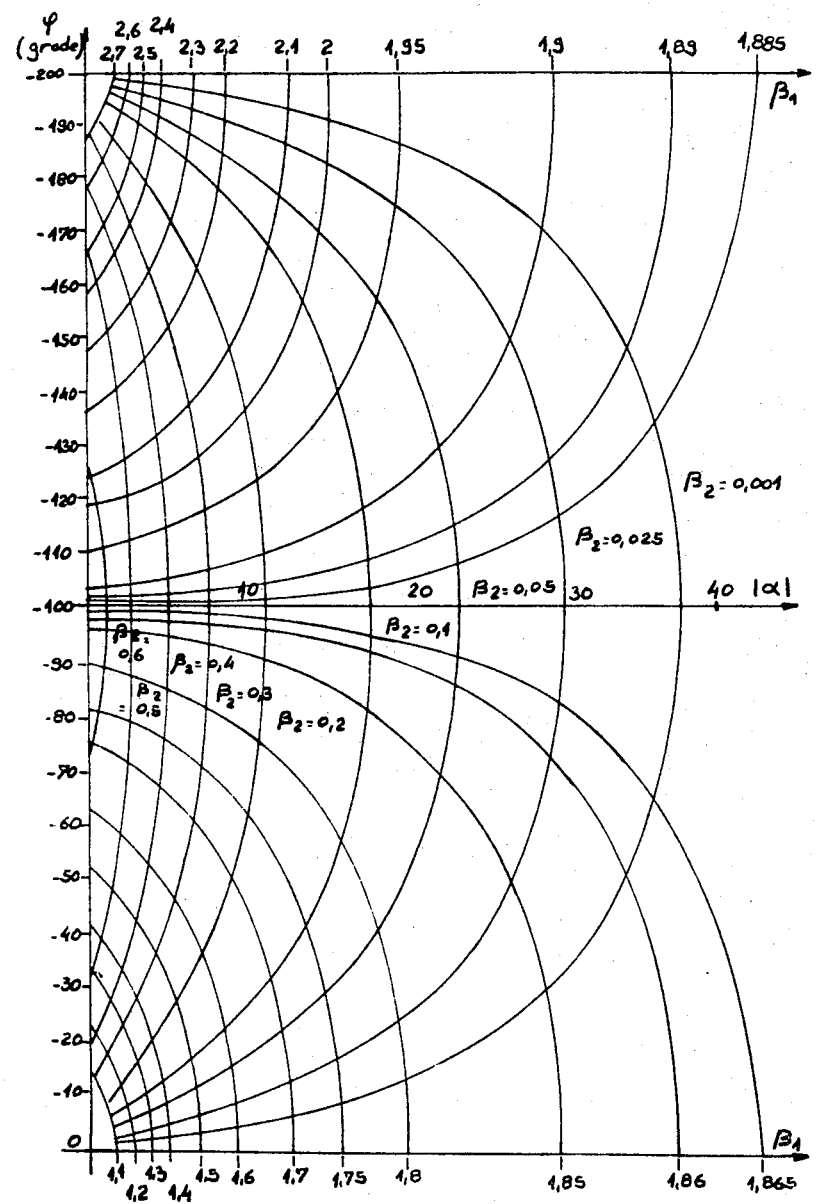
FIG. 3 is a graph giving the real and imaginary parts of the complex wave number $\beta$ from the measured values of the modulus $\alpha$ and the argument $\varphi$ of the mechanical amplification coefficient.

Now the values of $|\alpha|$ and $\varphi$ are obtained, it is obvious that the value of $\beta$ can be easily deduced, and thereafter the value of E, from relations (iii), (ii) and (i). Obviously, for each test-piece one knows the modular dimensions, length and cross-section, and the density of said material. The value of $\omega$ is measured as said. However, for computing the complex wave number $\beta$, it is of advantage to have recourse to a graph such as shown in FIG. 3 and which gives the values of the real part $\beta_1$ and of the imaginary part $\beta_2$ of said complex wave number. In the illustrative graph of FIG. 3, the main axes measure $\varphi$ along a scale of grades from 0 to $-200$ and $|\alpha|$ along a scale of decibels. The curves from the secondary scales $\beta_1$ give the values of the real part of the complex wave number, from 1.1 to 2.7 for any pair of measured values $\varphi$ and $|\alpha|$. The individual curves $\beta_2$ similarly give the values of the imaginary part for such pairs of measured values, from .6 to .001.

For the sake of clarity the number of curves has been shown reduced in FIG. 3 and in practice said number will be much higher so as to facilitate interpolations in the graphical reading of the curves.

It may be noted that, as the measure does not imperatively imply the recourse to a resonance condition of the test-piece, it is possible to extend the range of measures within a wide range of frequencies, i.e. at any frequency of vibration which may be thought better adapted to the material of the test-piece, and also to any wanted length of said test-piece.

What is claimed is:

1. A device for the determination of Young's modulus of visco-elastic materials comprising:

drive means for supporting a test piece of the material under study at a single location thereon and vibrating said test piece to cause flexure thereof about said location;

means for measuring the coefficient of mechanical amplification between a free end of said test piece and said location, wherein said measuring means includes first and second pairs of vibration amplitude and frequency sensors, one pair positioned on opposite sides of said free end and said single location of the test piece, respectively;

generating means furnishing an electric signal having a frequency which is high with respect to the frequency of said drive means;

first means for modulating said signal with the output of said first vibration amplitude and frequency sensor;

second means for separately modulating said electric signal from the output of said second vibration amplitude and frequency sensor;

comparing means for comparing the two thus obtained modulated signals by measuring the ratio of their amplitudes and the relative phase shift of their wave forms, respectively significant of the modulus and argument of the coefficient of mechanical amplification of said test piece;

and means for measuring the period of vibration of said test piece whereby the complex wave number of the test piece and consequently its Young's modulus can be computed from the measurement of said modulus and argument and of said period.

2. A device as defined by claim 1 including a pair of Wheatstone bridge circuits, said first pair of sensors forming two arms of one bridge and said second pair forming two arms of the other bridge; said bridges being connected to said generating means and to said comparing means.

3. A device for measuring the coefficient of mechanical amplification of a test piece of a visco-elastic material which is vibrated by drive means supporting said test piece at a single location thereon comprising in combination:

first and second pairs of vibration amplitude and frequency sensors positioned respectively one pair on opposite sides of said single location and the other pair on opposite sides of a free end of said test piece;

generating means furnishing an electric signal having a frequency which is high with respect to the frequency of the drive means;

first means for modulating said signal with the output of said first pair of sensors;

second means for separately modulating said electric signal from the output of said second pair of sensors;

comparing means for comparing the two thus obtained modulated signals by measuring the ratio of their amplitudes and the relative phase shift of their waveforms.

References Cited

UNITED STATES PATENTS

| | | | |
|---|---|---|---|
| 2,102,614 | 12/1937 | Couch | 73—67.2 |
| 2,316,253 | 4/1943 | Keinath | 73—67.4 |
| 3,005,334 | 10/1961 | Taylor et al. | 73—67.3 |
| 3,319,460 | 5/1967 | Barigant | 73—67.2 |

FOREIGN PATENTS 1,366,902   6/1964   France.

RICHARD C. QUEISSER, *Primary Examiner.*

JAMES H. WILLIAMSON, *Assistant Examiner.*

U.S. Cl. X.R.

73—15.6